(12) United States Patent
Fries (10) Patent No.: US 7,096,360 B1
(45) Date of Patent: Aug. 22, 2006

(54) FREQUENCY-TIME BASED DATA COMPRESSION METHOD

(76) Inventor: Jeffrey Michael Fries, 1216 S. Second Ave., Siler City, NC (US) 27344-4019

( * ) Notice: Subject to any disclaimer, the term of this patent is extended or adjusted under 35 U.S.C. 154(b) by 927 days.

(21) Appl. No.: 10/229,242

(22) Filed: Aug. 27, 2002

(51) Int. Cl.
*G06F 1/24* (2006.01)
(52) U.S. Cl. .......................................... 713/168; 726/3
(58) Field of Classification Search ................ 713/168; 726/3
See application file for complete search history.

(56) References Cited

U.S. PATENT DOCUMENTS

3,980,824 A 9/1976 Lamb et al.

*Primary Examiner*—Thomas R. Peeso (57) ABSTRACT

An "Frequency-Time Based Data Compression Method" supporting the compression, encryption, decompression, and decryption and persistence of many binary digits through frequencies where each frequency represents many bits.

4 Claims, 8 Drawing Sheets

FIG. 1

| Frequency in Hertz | 26 ~ 255 Hertz | 30 ~ 128 Hertz | 34 ~ 8 Hertz | 38 ~ 230 Hertz |
|---|---|---|---|---|
| Data Value in Hexadecimal 24 | FF  28 | 80  32 | 08  36 | E6  40 | t1　　　t2　　　t3　　　t4　　　t5

FIG. 2

Table of Data Frequencies and Special . Assume Data Gathering Rate Value 4.

| Frequency | Data Value Represented | Type of Representation | How Frequency is Calculated In Compression Algorithm |
|---|---|---|---|
| 16 hertz | 0000 | ZERO | Frequency = Max Data Value + 1 |
| 1 hertz | 0001 | DATA | Frequency = Data Value |
| 2 hertz | 0010 | DATA | Frequency = Data Value |
| 3 hertz | 0011 | DATA | Frequency = Data Value |
| 4 hertz | 0100 | DATA | Frequency = Data Value |
| 5 hertz | 0101 | DATA | Frequency = Data Value |
| 6 hertz | 0110 | DATA | Frequency = Data Value |
| 7 hertz | 0111 | DATA | Frequency = Data Value |
| 8 hertz | 1000 | DATA | Frequency = Data Value |
| 9 hertz | 1001 | DATA | Frequency = Data Value |
| 10 hertz | 1010 | DATA | Frequency = Data Value |
| 11 hertz | 1011 | DATA | Frequency = Data Value |
| 12 hertz | 1100 | DATA | Frequency = Data Value |
| 13 hertz | 1101 | DATA | Frequency = Data Value |
| 14 hertz | 1110 | DATA | Frequency = Data Value |
| 15 hertz | 1111 | DATA | Frequency = Data Value |
| 17 hertz | None | PREAMBLE 1 | Frequency = Maximum Data Value + 2(start of data pattern) |
| 18 hertz | None | PREAMBLE 2 | Frequency = Maximum Data Value + 3(start of data pattern) |
| 19 hertz | None | POST AMBLE 1 | Frequency = Maximum Data Value + 4(end of data pattern) |
| 20 hertz | None | POST AMBLE 2 | Frequency = Maximum Data Value + 5(end of data pattern) |
| 21 hertz | None | ENCRYPTION1 | Frequency = Maximum Data Value + 6(supports data encryption) Encryption1 = Add |
| 22 hertz | No Data | ENCRYPTION2 | Frequency = Maximum Data Value + 7(supports data encryption) Encryption2 = Subtract |

Table Illustrating the Number of Bits sent per Frequency Detection Period based on Data Gathering Rate

| Minimum Data Value Supported | Maximum Data Value Supported | Data Gathering Rate(DGR) Value Specifying # of bits | Minimum and Maximum Data Values in Decimal | Number of Bits Sent in each Frequency Detection Period(FDP) |
|---|---|---|---|---|
| 0x0000 | 0x3 | 2 | 0 - 3 | 2 |
| 0x0000 | 0xF | 4 | 0 - 15 | 4 |
| 0x0000 | 0x00FF | 8 | 0 - 255 | 8 |
| 0x0000 | 0xFFFF | 16 | 0 - 65,535 | 16 |
| 0x0000 | 0xFFFFFFFF | 32 | 0 - 4,294,967,295 | 32 |
| 0x0000 | 0xFFFFFFFFFFFF | 64 | 0 - 2.81474e 01 | 64 |

FREQUENCY-TIME BASED DATA COMPRESSION METHOD

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

Current serial modem technologies support the movement of data one binary digit(bit) at a time. This technology creates a serious limitation as data is processed one bit at a time as the bits await the use of the serial medium.

Specifically, this invention solves this problem by providing a new and useful invention method allowing many bits of data to be represented in each serial transfer cycle. This invention relates to the field of data processing.

BACKGROUND OF THE INVENTION

This invention relates to data processing. Specifically, the Frequency-Time Based Compression Method is a new and useful invention method which compresses and decompresses many bits of data. These bits of data can be processed such as sending them over a serial transport, encrypting them, or storing them on persistent storage media.

The Frequency-Time Based Compression Method gathers data and compressing it by representing it as a single frequency having the value of the gathered data and asserting the frequency to serial media for a predetermined amount of time. Serial Media can be, but not be limited to, a phone line, a floppy disk, a CD, a hard disk, a computer buss address or data line, a fiber optic cable strand, etc. where it can later be sensed, decoded and re-gathered into the originally compressed bits.

This invention relates generally to the field of data processing and more specifically to the Frequency-Time Based Digital Data Compression Method. Historically Data has been delivered to serial media by send a one frequency representing a one and another frequency representing a zero. Each frequency is transmitted one after another and effectively one bit at a time is sent over a serial medium. Historically each frequency representing one bit was applied to the serial medium for one serial transfer cycle.

My new and useful invention applies one frequency in one serial transfer cycle. Each frequency represents many binary digits(bits). The effect of representing many bits as one frequency allows data to be effectively sent as parallel data over serial media. Assuming one serial transfer cycle is the amount of time to detect and decode one frequency this invention removes the bottleneck of sending one bit at a time, by sending many bits at a time providing effective bandwidths compared to moving parallel data over a serial transport in each serial transfer cycle.

BACKGROUND OF INVENTION-OBJECTS AND ADVANTAGES

The primary object of this compression method is to process many bits of data making them available as one frequency to serial media. The Frequency-Time Based Data Compression Method method provides a means of compressing binary digits(bits) by gathering a number of bits as specified by the Data Gathering Rate(DGR) value, the decimal value of the gathered bits equals the frequency generated by a frequency generator device such as a Tone Encoder. The frequency generated by the frequency generating device is presented to the serial media. Serial Media existing today can be, but is not limited to, a phone line, optical cable strand, storage medium such as a floppy disk, CD disk, hard disk, or a computer's address or data lines. The frequency is asserted on a serial media for the Frequency Detection Period(FDP). The FDP is the amount of time necessary for a given frequency to be asserted(to serial media) and characterized as the asserted frequency. Each FDP contains one frequency followed by the next frequency in the next FDP, and so on. Each FDP(frequency) representing the number of bits gathered as specified by the Data Gathering Rate(DGR) value.

The second object of this compression method is the storage of massive amounts of data by storing frequencies with each frequency representing a collection of data.

The third object of this compression method is a realization of Energy Savings. The Frequency-Time Based Data Compression Method supports real-time medical monitoring over conventional transports such as phone lines. The Energy Savings results in the savings resulting from patients not needing to travel and from doctors offices. Another example of Energy Savings is the use of this invention to provide real-time Televideo Conferencing resulting in Energy Savings through the reduced number of trips necessary by business people who through real-time Televideo Conferencing can hold conferences and meetings remotely.

The fourth object of this compression method is it Counters Terrorism. The sender and receiver of data can agree upon a number of FDPs for each data transport(key). For instance say the number is 5, then an encryption code can be placed in every sixth frequency. If the encryption code is add1, then a value of one can be added to each of the five following data frequencies sent. Unless hackers knew the agreed upon number(key) they would not know where the next encryption code is versus the frequencies used to represent data.

The fifth object of the invention is it Enhances Quality Of Life. This invention accomplishes this object by providing a high speed Data Transport resulting in a more enjoyable lifestyle by not waiting for data when utilizing Virtual Reality Web Interaction, Real Time Virtual Reality Gaming, Real Time Multimedia, Video on Demand, etc.

The sixth object of this compression method is reduced Traffic Congestion on Telecommunications Switching Networks. Frequencies will be sent instead of data resulting in less traffic on and through all Telecommunications Switching Networks.

The seventh object of this compression method is to provide Extremely High Speed Communications in the National Interest in the areas of military communications, encryption, Virtual Reality Distributed Simulators, and many other Military oriented applications. The Frequency Based Digital Data Compression System and Method supports high volume data transfers over conventional serial mediums such as phone lines, optical cable, radiowaves, etc. and can likewise be applied to future serial mediums.

The eight object of the Frequency Based Digital Data Compression System and Method is one application of this technology could be a high compression modem or network device offering extremely high data rates over conventional rural phone systems.

The ninth object of the invention is it Enhances Quality Of Life through High Speed Delivery of Video On Demand, Virtual Reality Gaming, Distributed Virtual Reality Gaming, Virtual Reality Mall, Virtual Walkthrough, and Virtual Simulator data.

The tenth object of this compression method Enhances both Quality of Life and affords Energy Savings through its application to Remote Medicine. The medical field could apply this technology providing real-time remote monitoring of patients. Energy Savings will result through the reduced need for the patient to travel to the medical office. This application also Enhances Quality of Life by reducing the amount of time a patient spends driving to the medical facility, waiting at the medical facility waiting rooms, the amount of time while being seen by the doctor, and the amount of time while returning home.

Further objects and advantages of my invention will become apparent from a consideration of the drawings and ensuing description.

SUMMARY

In accordance with a preferred embodiment of the invention, there is disclosed an invention that involves a series of steps yielding the compression and decompression of digital data based on the sending(and receiving) of frequencies comprising the steps of: 1. Gathering N bits of data, where N is equal to the current value specified in the Data Gathering Rate(DGR) from any useful application. 2. Presentation of the collected data to a Frequency Generating Device such as a Frequency Encoder. 3. which places the frequency on a serial medium for the agreed upon Frequency Detection Period. 4. Detection and decoding of the frequency received from the serial medium by a device such as a Frequency Decoder. 5. Decompression of the gathered data once again by utilizing the current value of the Data Gathering Rate. Zero filling or truncating the value received from the Frequency Decoder to make the number of bits equal to the current value specified in the Data Gathering Rate(DGR) possibly modifying the most significant bits. 6. Presentation of the bits to any useful application.

DRAWINGS—FIGURES

The drawings constitute a part of this specification and include exemplary embodiments to the invention, which may be embodied in various forms.

FIG. 5 is a timing diagram illustrating special valued frequencies. Each frequency having special meaning such as preamble frequencies signaling the start of data, data frequencies(one for each Data Gathering Rate number of binary digits), a frequency representing a binary zero data value, and so on.

DETAILED DESCRIPTION—FIGS. 1 THRU 8—PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The Frequency-Time Based Data Compression Method is described by the accompanying figures, but first let's describe the terms used:

The Data Gathering Rate(DGR) is the number of bits to be compressed, encrypted or persisted to a serial medium or decompressed, decrypted, or unpersisted from a serial medium. This is a settable value.

The Frequency Detection Period(FDP) is the minimal amount of time necessary for a frequency to be asserted and identified to/from a serial medium. This too is a settable value.

The Encryption Control Command specified how to encrypt Data Frequencies which follow. Encryption Control Commands can be, but not limited to, Add, Subtract, None, or Invert Data.

The Encryption Data Value is a user specified number to be used with Add or Subtract Encryption Control Commands.

The Encryption Control Period specifies the number of Data Frequencies encrypted as defined by the Encryption Control Command and Encryption Data Value pair. The Encryption Control Period is a user settable value agreed upon by both the encryptor and decryptor of Data Frequencies(or the sending and receiving ends). The Encryption Control Period is the number of FDPs between the last Encryption Data Value and the next Encryption Control Command.

The Base Frequency is a frequency used to represent a binary zero. This is also a settable value.

The Data Frequency is a frequency representing the number of bits gathered as specified by the Data Gathering Rate. The Data Frequency is calculated as:

Data Frequency=Base Frequency+binary data value, the result modified by the Encryption Control Command of the Encryption Data Value(such as Add 5, Subtract 10, etc.)

A Control Frequency is a frequency used to represent special control codes used for PreAmble1 and 2(Start of Data), Encryption Control Command and Encryption Data Value, and PostAmble1 and 2(End of Data).

Figure 1:
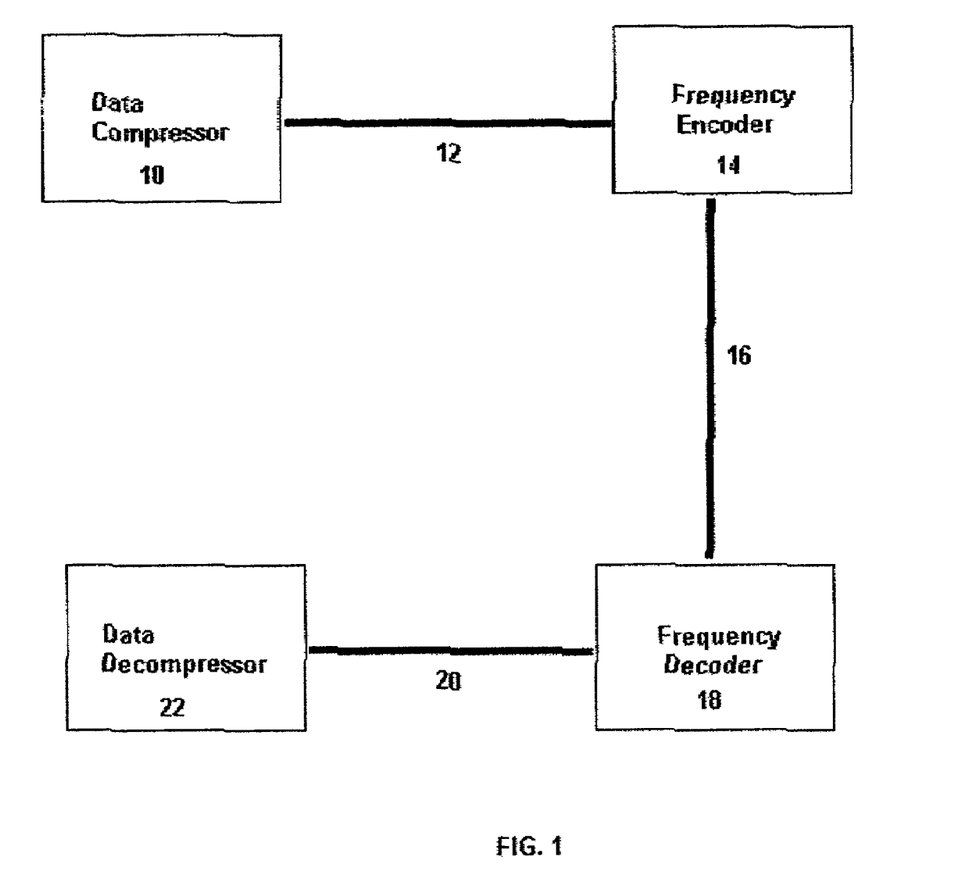
FIG. 1 is a schematic block diagram of the data processing system. It illustrate how binary data is presented to the Frequency Encoder, the Frequency(compressed data) is placed on the Serial Media, received by a Frequency Decoder and decompressed into binary data.

Let's begin by describing FIG. 1 assuming a Data Gathering Rate(DGR) set to four, an Encryption Control Command of Add, an Encryption Data Value of zero, and a Base Frequency of one(binary zero equals 1 hertz).

Since the Data Gathering Rate value is four, four bits are gathered by the Data Compressor(10) from any useful application(let's assume a binary value $1011_2$ is gathered) and the Data Frequency is calculated:

Data Frequency=Base Frequency+binary data value+ Encryption Data Value 12 hertz=1 hertz+$11_{10}$+0

This value twelve is presented to the digital side(12) of a frequency generating device such as a Frequency Encoder (14). The Frequency Encoder asserts a 12 hertz frequency for one Frequency Detection Period(FDP) onto a serial medium(16). The asserted frequency is received by a Frequency Detection Device such as a Frequency Decoder (18) and identified as 12 hertz. The Frequency Decoder(18) converts the 12 hertz frequency to a binary value 12 presented on the digital output side(20) of the Frequency Decoder(18) where it is decompressed by the Data Decompressor(22) by reversing the Data Frequency Calculation:

Binary Data Value=asserted Data Frequency—Encryption Data Value—Base Frequency $11_{10}$=12 hertz–0–1hertz to a binary data value of $11_{10}$ or $1011_2$. Applying the Data Gathering Rate(DGR) value of four, the bits are adjusted to four bits(if necessary) either by truncating or zero filling the most significant bits and presented to any useful application as the originally sent four bits of $1011_2$ as gathered by the Data Compressor(10).

Figure 2:
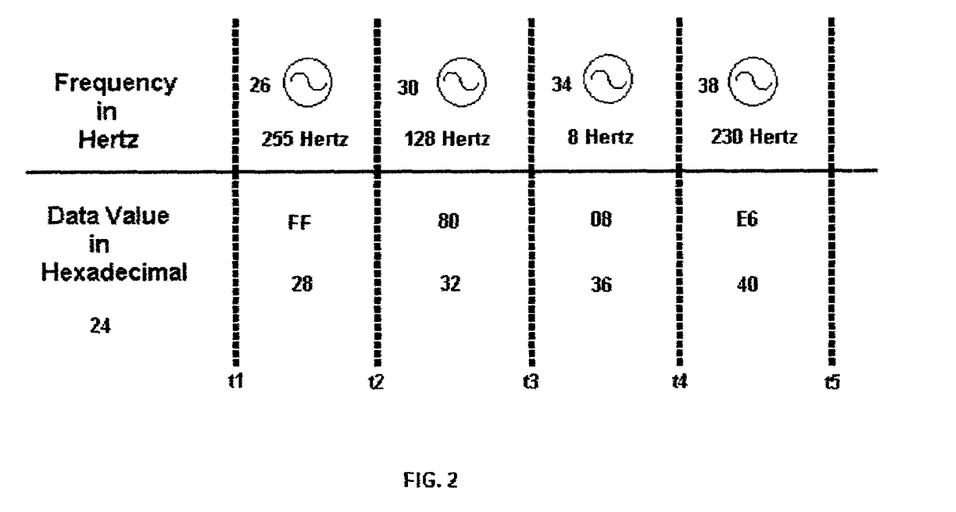
FIG. 2 is a timing diagram illustrates the sending of frequencies in a sequential form over the Serial Medium, each frequency is presented for one Frequency Detection Period and Decompressed by re-gathering into hexadecimal binary data values.

Turning to FIG. 2 let's assume a Data Gathering Rate of eight, a Base Frequency of zero, and an Encryption Data Value of zero. The Data Gathering Rate value of eight results in one Frequency assertion for every 8 data bits. The Data Frequency is asserted for one Frequency Detection Period.

Frequencies are presented in Hertz and Data Values in Hexadecimal notation(24).

Assume we want to move the hexadecimal value FF8008E6 over a serial medium. To do so we send four frequencies:

The first eight bits having the hexadecimal value 0xFF (26). The Frequency is calculated as: 0+$11111111_2$+0 or a Frequency of 255 hertz(26) is asserted for a Frequency Detection Period of Time(t1–t2).

The next eight bits having a hexadecimal value 0x80(32) are sent as a frequency of 128 hertz(30) for the next FDP(t2–t3). To next bits having a hexadecimal value Ox08 (36) are sent as a frequency of 8 hertz(34) in the next FDP(t3–t4) and the last eight bits having a hexadecimal value 0xE6(40) are sent as a frequency of 230 hertz(38) for the last FDP(t4–t5).

Figure 3:
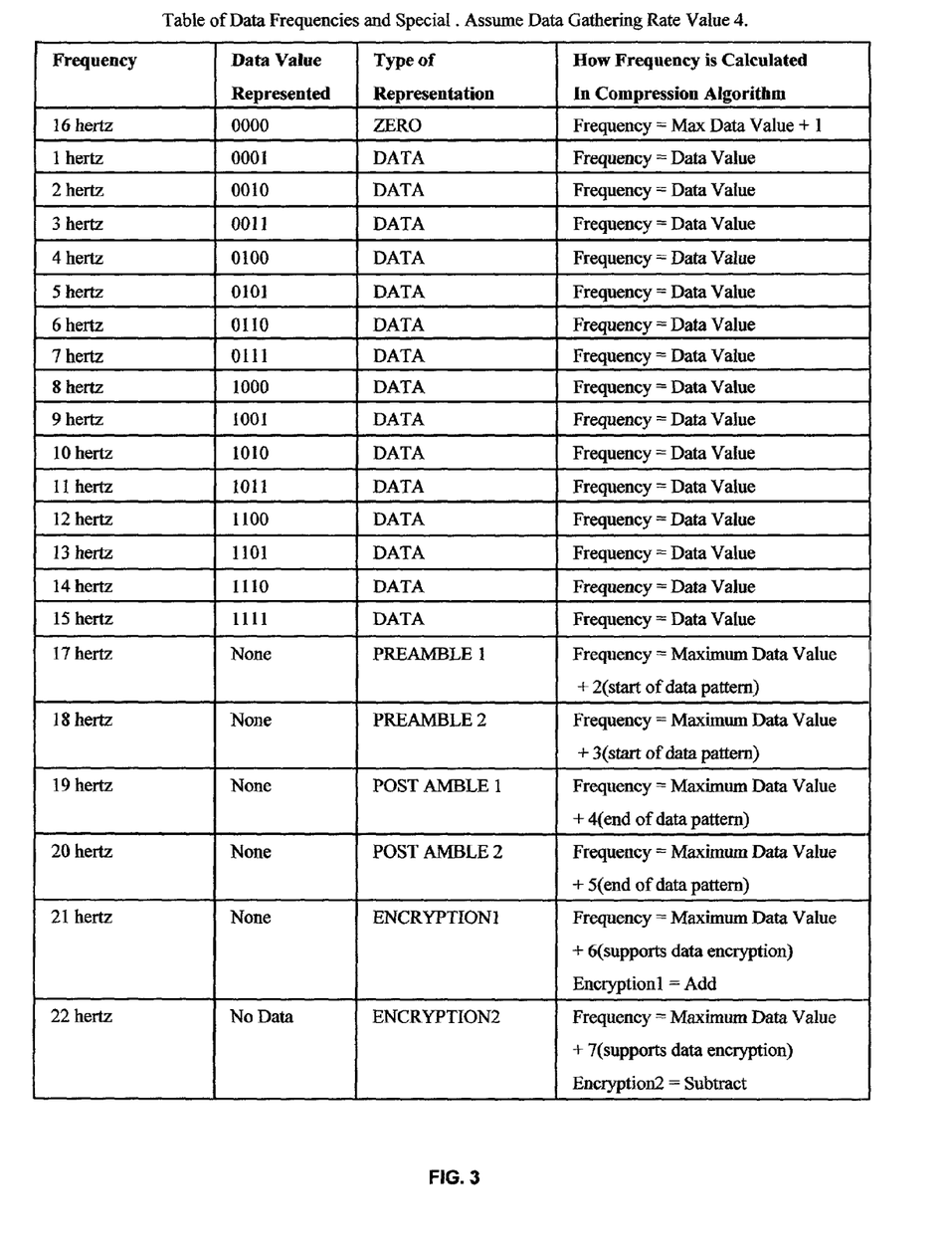
FIG. 3 is a table illustrating frequency values for frequencies representing data or frequencies having special meaning to the "Frequency-Time Based Data Compression Method".

Turning to FIG. 3 find a table illustrating how each Data Frequency can represent binary data values.

Also shown are special frequencies each known as one Control Frequency. A Control Frequency is used to send special values such as a hexadecimal zero(if Base Frequency is zero), a preamble condition which allows internal synchronization of both the sender and receiver indicating that data is about to be sent and a post amble indicating completion of data. The first Encryption value Encryption1 is the Encryption Control Command and indicates how to encrypt the following Data Frequencies. There is one each for: No Encryption, Add, Subtract, or Invert Data. Each of these frequencies are user settable.

The second Encryption value Encryption2 is the Encryption Data Value. The Encryption Data Value is the value added if the Encryption1 specifies an Add or the value subtracted if Encryption1 specifies a Subtract. This value is ignored for a Invert or No Encryption. This value is also user settable.

Figure 4:
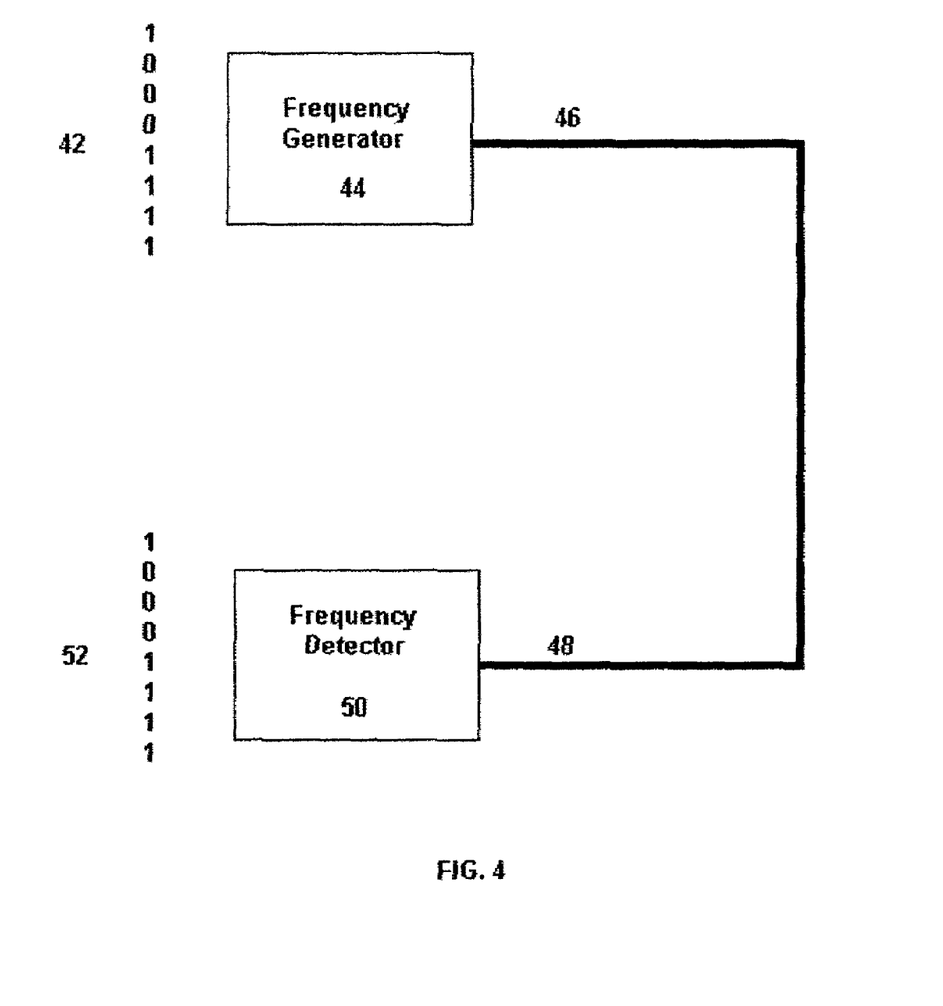
FIG. 4 is a block diagram depicting how the "Frequency-Time Based Data Compression Method" transfers eight bits of data as one frequency.

FIG. 4 is an application of this invention. Assuming a Base Frequency of zero and an Encryption Control Command of No Encryption, the hexadecimal value 0x8F(42) is presented as is by the Data Compressor to the Frequency Generator(44), the Frequency Generator asserts a frequency of 143 hertz on the serial medium(46) and is received(48) by a Frequency Detector(50) which presents it once again to the hexadecimal value of 0x8F(52) as is by the Data Decompressor.

Figure 5:
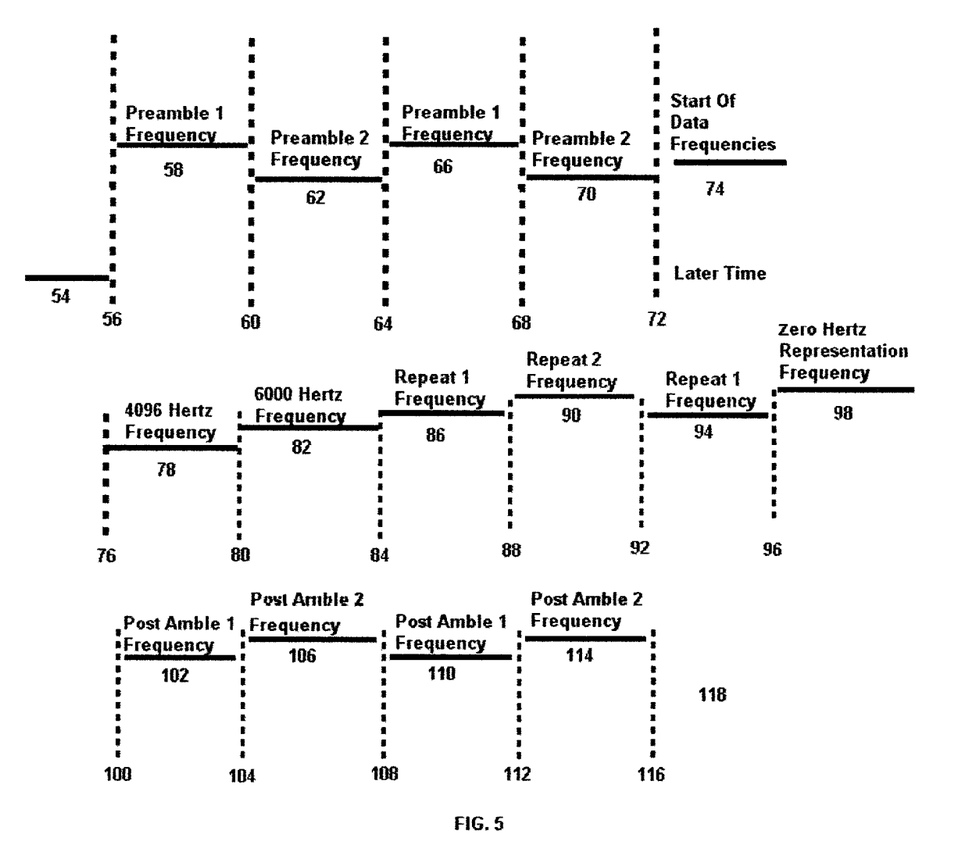

Turning to FIG. 5 is timing diagram illustrating the order of Control and Data Frequencies sent. This illustration assumes an Encryption Control Period of 5.

We begin with s1 representing a PreAmble1, s2 is PreAmble2 and are sent twice in succession to indicate the start of data. They are followed by the Encryption Control Command(Ec) and the Encryption Data Value(Ev). The following data d1 through d5 is encrypted using this Encryption Control Command(Ec) and Encryption Data Value(Ev) pair, followed by another Encryption Control Command(Ec) and Encryption Data Value(Ev) pair indicating how to encrypt(or decrypt) the next five Data Frequencies d6 through d10, followed by another Encryption Control Command(Ec) and Encryption Data Value(Ev) pair indicating how to encrypt(or decrypt) the next five Data Frequencies, but there is no more data. The PostAmble1(e1) and PostAmble(e2) Control Frequencies are sent to indicate end of data and Ed is detected.

Figure 6:
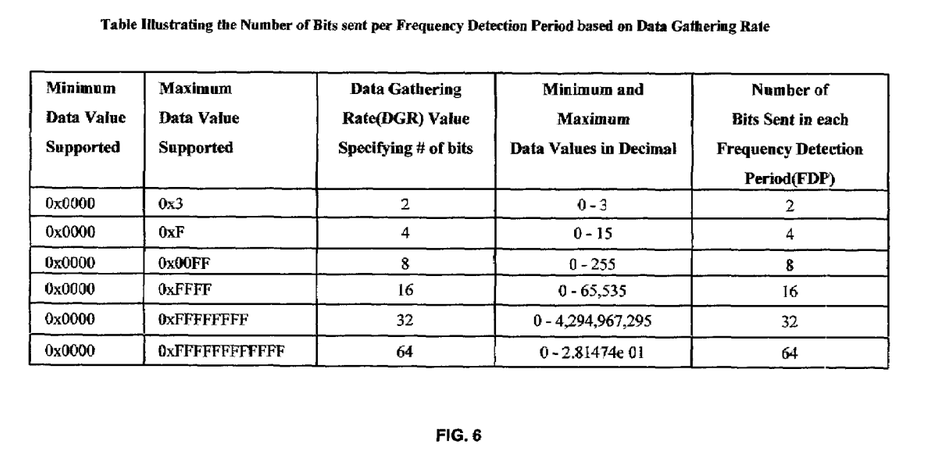
FIG. 6 is a table illustrating the number of bits sent per Frequency Detection Period for various Data Gathering Rate values.

Turning to FIG. 6 we see larger amounts of data can be transported or persisted when the Data Gathering Rate setting is increased. This is important when talking about packing densities to serial persistent devices as an increase in the Data Gathering Rate with a resulting increase in Data Frequency stores more data per measure of storage real estate.

Using a Data Gathering Rate of 1000 stores 1000 times more data than is stored based on today's storage technologies.

Figure 7:
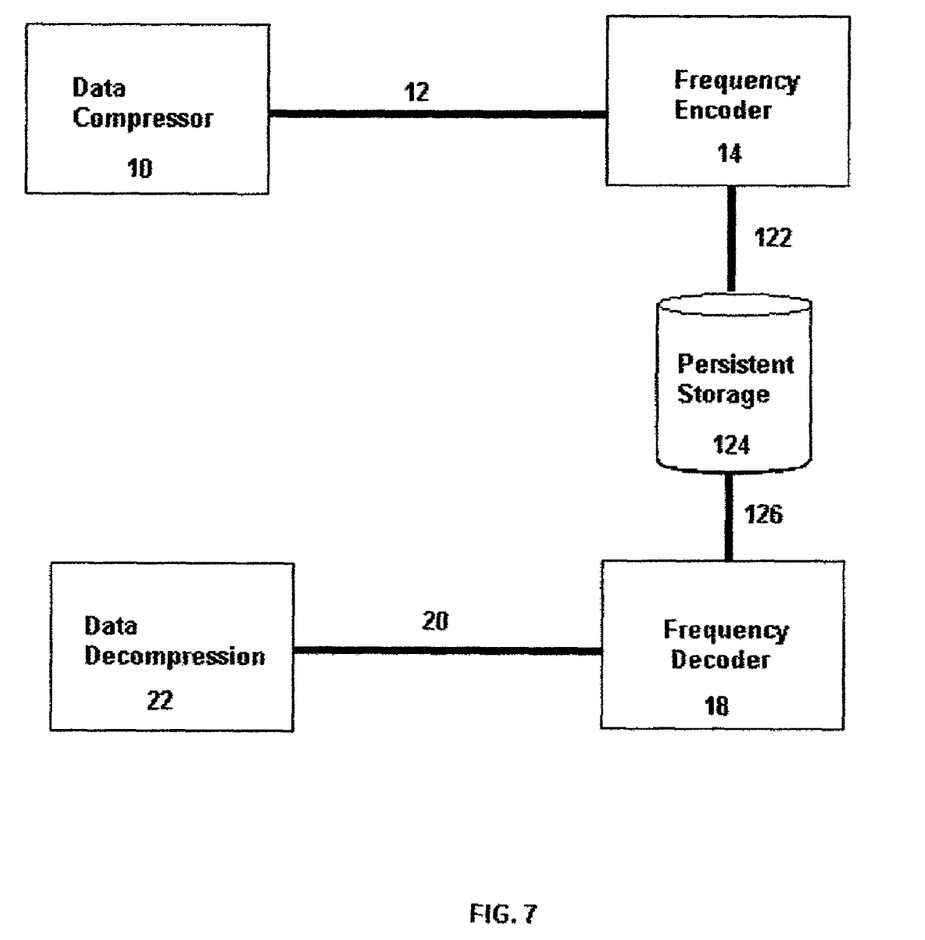
FIG. 7 is a block diagram illustrating how frequencies can be used to represent data stored on a persistent storage medium.

FIG. 7 illustrates digital data peristence using the Frequency-Time Based Data Compression Method. Assuming a Base Frequency of 1 hertz, a Data Gathering Rate of 16, Encryption Control Command of Add, Encryption Data Value of 10, the Data Compressor(10) gathers the first 16 bits. Let's assume it gathers a hex value of 0x0200, the Data Compressor calculates a Data Frequency of 523 hertz:

Data Frequency=Base Frequency+binary data value+ Encryption Data Value 523 hertz=1 hertz+$512_{10}$+$10_{10}$ The value of 523 is presented to the digital side(12) of the Frequency Encoder(14), the Frequency Encoder outputs a Data Frequency of 523 hertz(122) to the Persistent Storage (124) where the Data Frequency is placed on the Persistent Storage Media. The data is read from the Persistent Storage (124) as a Data Frequency. The Data Frequency is sensed at the analog side of the Frequency Decoder(18) as a 523 hertz frequency.

The value of 523 appears on the digital side(20) of the Frequency Decoder where Data Decompression (22) calculates:

Binary Data Value=523 hertz−1hertz−$10_{10}$ $512_{10}$=523 hertz−1hertz−$10_{10}$ where the value of $512_{10}$ or 0x200 is the value of the persisted data.

Figure 8:
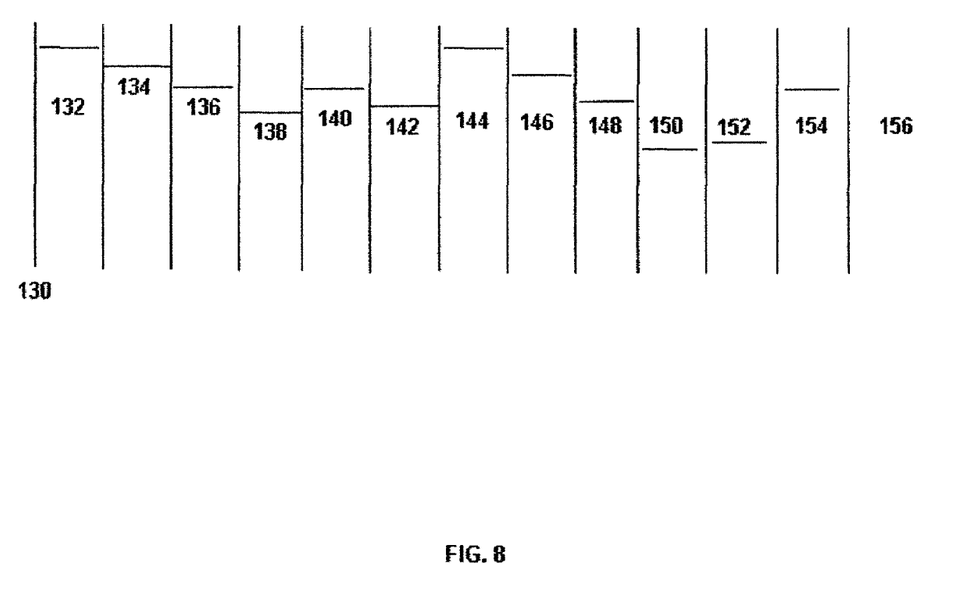
FIG. 8 is a timing diagram illustrating the real-time embedded encryption capabilities of the "Frequency-Time Based Data Compression Method".

FIG. 8 shows a series of Data Frequencies. The first frequency starting at 130, frequencies 132, 134, 136, 138, 140, 142, 144, 146, 148, 150, 152, and 154 show transitions from one frequency to the next. These transitions are used to synchronize an internal clock. The internal clock is used for repeat frequencies. If the frequency is repeated, then the data it represents is also repeated. This occurs for the number of Frequency Detection Periods as is necessary to indicate that data is repeating and the data should be presented to any useful application as such.

Qualities & Benefits:

Energy Savings through reduced computer power-on time as data will transfer at higher rates of speed.

Energy Savings through application of method improving Televideo Conferencing reducing the reliance on ground and air transportation.

Energy Savings realized through Real Time Remote Medical Monitoring creating less dependency on patients traveling to see doctor.

Energy Savings through reduced Traffic Congestion on Telecommunications Switching Networks possibly thereby also providing Energy Savings.

Counters Terrorism by providing high data rates supporting a Real Time Dynamic Encryption Algorithm. A Dynamic Encryption Algorithm can be realized by embedding the Encryption Algorithm in the transmitted data.

In the National Interest, another application of the Method increases computer data and address buss widths through data expansion. Example: a 32 bit computer could become a 32,000 bit computer.

Enhances Quality Of Life by providing a Data Transport method for Real Time Virtual World Web Navigation.

Enhances Quality Of Life through High Speed Delivery of Video On Demand, Virtual Reality Gaming, Macromedia Players, and Virtual Reality Malls.

Enhances Quality of Life through Remote Medical Monitoring. Patients do not have to spend many hours traveling or at the doctor's office.

Enhances many applications by providing extremely high data transfer rates.

Supports Extremely High Speed Communications which can be used in the National Interest.

One application of the Method provides High Speed Internet Connectivity(WAN) in Rural Areas.

Another application of this method is a replacement Modem and Networking Device Technology providing low cost Wide Area Networking.

Primary Elements:

Collecting a number of binary digits from any useful application.

Compressing the number of binary digits through a Frequency Generator.

Presenting the Frequency on a Serial Transport Medium.

Representing zero valued data, start of data, end of data, and no data by Frequencies representing each.

Detecting the Frequency on the Serial Transport Medium.

Decompressing the Detected Frequency received by a Frequency Detector into the original Collected number of binary digits Presenting the binary digits to any useful application.

Secondary Elements:

Reduction in Time When Waiting for Data Receipt through a Real Time Transport of Data Application of Method.

Avoid Airline or Other Travel through Real Time Televideo Conferencing Application of Method.

Data Gathering Rate is defined as the number of bits to collect and present through the Method.

Frequency Detection Period is defined as the Amount Of Time a Frequency has to be presented on a Serial Transport Medium prior to it's Frequency being Detected.

A method of using frequencies to represent data patterns such as but not limited to Start of Data, Zero Data Value, No Data To Send, End of Data, etc.

SUBSTITUTION ELEMENTS

Use different assignments for each data pattern such as but not limited to Start of Data, Data Value Zero, End of Data, etc.

Use different transmission and reception devices other than Tone Encoders and Decoders.

Use any form of Medium not limited to Sound, Light, or Electrical sinusoidal waves.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A new digit data compression method providing the means to transport parallel digital data over a serial medium, comprising the steps of:
   (a) Gathering N bits of binary Digital Data; where N is the Data Gathering Rate setting; from a useful application;
   (b) Compressing the binary data by converting its binary value into a decimal value called the Binary Data Value and using the following calculation where the Data Frequency; in hertz; equals the Base Frequency plus the Binary Data Value;
   (c) Presenting the said Data Frequency to a Frequency Generating Device such as a Frequency Encoder which asserts the frequency on a serial medium for a duration of time equal to the Frequency Detection Period; the amount of time necessary for the recipient to detect and decode the asserted frequency;
   (d) Detecting and Decoding the asserted Data Frequency by a device; such as but not limited to a Frequency Decoder; as the Decoded Frequency;
   (e) Converting the said Decoded Frequency into the said Binary Data Value whereas the said Binary Data Value equals the said Decoded Frequency minus the said Base Frequency;
   (f) Zero-filling the said Binary Data Value most significant bits until the number of bits zero filled are equal to the said Data Gathering Rate;

(g) Presenting the zero filled binary data to any Useful Application;

whereby parallel data can be transported over a serial medium providing high volume data transfers over commonly available media.

2. An new digital data compression method providing the means of storing parallel data on a serial storage media, comprising:
   (a) Gathering binary data based on a Data Gathering Rate Setting;
   (b) Compressing the binary data by converting its binary value into the equivalent decimal value and calculating its Date Frequency by adding the Base Frequency Value to the said binary value;
   (c) Storing the said Data Frequency onto a serial storage media;

whereby data can be stored by storing parallel data in the form of frequencies of serial storage media devices.

3. A new digital data decompression method providing the means of retrieving parallel data from a serial storage media, comprising:
   (a) Retrieving the stored said Data Frequency from a serial storage media;
   (b) Calculating the Data Frequency decimal value by subtracting the Base Frequency from the said Retrieved Data Frequency;
   (c) Converting the retrieved said Retrieved Data Frequency from a decimal value into a binary Data Value;
   (d) Zero-filling the said binary Data Value most significant bits until the number of bits are equal to the said Data Gathering Rate Setting of claim 2;

whereby parallel data can be retrieved from serial storage media devices.

4. A new multi-dimensional digital data encryption/decryption method wherby the first dimension is provided by the Base Frequency and the second dimension is provided by the rate in which the encryption algorithm is embedded in the data being secured, comprising:
   (a) Fetching a Encryption Control Command and Encryption Data Value Pair from a user specified and created list of Encryption Control Command and Encryption Data Value Pair sets; whereas each pair in the list is sequentially accessed as needed, and when the list is exhausted, the next Encryption Control Command and Encryption Data Value pair is fetched from the beginning of the list, and the list is recycled as as needed;
   (b) Converting the Encryption Control Command into a Data Frequency by setting the Data Frequency equal to the Encryption Control Command Value,
   (c) Applying the Data Frequency to the serial medium for one Frequency Detection Period;
   (d) Converting the Encryption Data Value into a Data Frequency by setting the Data Frequency equal to the Encryption Data Value;
   (e) Applying the Data frequency to the serial medium for one Frequency Detection Period;
   (f) Gathering the next N data bits; where N equals the Data Gathering Rate as a Binary Data Value from any useful application;
   (g) Calculating the Data Frequency as Date Frequency; in hertz; equals the Base Frequency plus the Binary Data Value;
   (h) Encrypting the Data Frequency based on an Encryption Control Command such as but not limited to, Add, Subtract, Invert, etc. and the Encryption Data Value;
   (i) Applying the Encrypted Data Frequency to the serial medium for one Frequency Detection Period;
   (j) Repeating Steps 6 through 9 until the Encryption Control Period's number of Data Frequencies have been applied to the serial medium;
   (k) Repeating Steps 1 through 10 until all application data has been processed,
   (l) Reversing this process to decrypt data from the serial medium to any useful application;

whereby data is secured by means of a multi-dimensional encryption method wheras adequate complexity is added to raise the level of difficulty in breaking the encryption preventing the exposure of secured data to unauthorized personnel, and;

whereby agreement upon a mutual Base Frequency by the encryptor and decryptor offers the first encryptional dimension, and mutual agreement upon the rate of change of the encryption algorithm; embedded in the transported data; providing the second encryptional dimension.

* * * * *